United States Patent
Yamawaki

(10) Patent No.: US 8,706,370 B2
(45) Date of Patent: Apr. 22, 2014

(54) LOCKUP CLUTCH CONTROL APPARATUS AND LOCKUP CLUTCH CONTROL METHOD

(75) Inventor: Morimasa Yamawaki, Tokyo (JP)

(73) Assignees: JATCO Ltd, Fuji-shi (JP); Nissan Motor Co., Ltd., Yokohama-shi (JP)

(*) Notice: Subject to any disclaimer, the term of this patent is extended or adjusted under 35 U.S.C. 154(b) by 174 days.

(21) Appl. No.: 13/085,948

(22) Filed: Apr. 13, 2011

(65) Prior Publication Data

US 2011/0264344 A1 Oct. 27, 2011

(30) Foreign Application Priority Data

Apr. 26, 2010 (JP) ................................. 2010-100564

(51) Int. Cl.
*G06F 7/00* (2006.01)

(52) U.S. Cl.
USPC ............................................. 701/68; 701/69

(58) Field of Classification Search
USPC ........ 192/3.28, 3.29, 3.3, 3.31; 477/166, 174, 477/180; 701/67, 68
See application file for complete search history.

(56) References Cited

U.S. PATENT DOCUMENTS

| 2002/0006848 | A1* | 1/2002 | Tabata | 477/32 |
| 2003/0195084 | A1* | 10/2003 | Tabata | 477/168 |
| 2004/0016419 | A1* | 1/2004 | Satou et al. | 123/492 |
| 2007/0207893 | A1* | 9/2007 | Iwao et al. | 477/32 |

FOREIGN PATENT DOCUMENTS

| EP | 0493699 A1 | 7/1992 |
| JP | 62-228750 A | 10/1987 |
| JP | 04-203561 A | 7/1992 |
| JP | 2008-115901 A | 5/2008 |

* cited by examiner

*Primary Examiner* — John Q Nguyen
*Assistant Examiner* — Jordan S Fei
(74) *Attorney, Agent, or Firm* — Foley & Lardner LLP

(57) ABSTRACT

A lockup clutch control apparatus controls slippage of a lockup clutch to a desired slippage by manipulating clutch engagement force of the lockup clutch, wherein an engine is provided with a supercharger, and a torque converter is disposed between the engine and an automatic transmission, and provided with the lockup clutch. The lockup clutch control apparatus includes a controller configured to: set the clutch engagement force based on a measured value of torque inputted to the lockup clutch; determine whether the engine is operating in a predetermined supercharger lag region in which the measured value deviates from an actual value of the torque; and perform a first operation of correcting the clutch engagement force by reducing the clutch engagement force in response to determination that the engine is operating in the supercharger lag region.

10 Claims, 6 Drawing Sheets

FIG.8A
THROTTLE VALVE OPENING

FIG.8B
MEASURED ENGINE TORQUE / ACTUAL ENGINE TORQUE

FIG.8C
DESIRED SLIPPAGE CORRECTION
0

FIG.8D
CONTROL PHASE

FIRST PHASE | SECOND PHASE | CLOSING PHASE

FIRST PHASE TIMER | SECOND PHASE TIMER t1  t2  t3  t4  t5  t6

LOCKUP CLUTCH CONTROL APPARATUS AND LOCKUP CLUTCH CONTROL METHOD

BACKGROUND OF THE INVENTION

The present invention relates to a lockup clutch control apparatus or system and method for controlling a lockup clutch, wherein a torque converter is disposed between an engine and an automatic transmission, and provided with the lockup clutch.

Japanese Patent Application Publication 4-203561 discloses a lockup clutch control apparatus which is configured to perform a feedback control of controlling slippage of a lockup clutch to a desired slippage with reference to a measured slippage of the lockup clutch and a measured engine torque.

SUMMARY OF THE INVENTION

If the lockup clutch control apparatus disclosed in Japanese Patent Application Publication 4-203561 is applied to an engine system provided with a supercharger, this lockup clutch control apparatus may fail to correctly control slippage of a lockup clutch when a supercharger lag occurs with the engine system, because the lockup clutch control apparatus takes no account of supercharger lag with which an actual value of input torque may be deviated from and smaller than a measured value of the input torque due to measurement error.

In view of the foregoing, it is desirable to provide a lockup clutch control apparatus capable of correctly controlling slippage of a lockup clutch in a supercharged engine system even when a supercharger lag occurs.

According to one aspect of the present invention, a lockup clutch control apparatus for controlling slippage of a lockup clutch to a desired slippage by manipulating clutch engagement force of the lockup clutch, wherein an engine is provided with a supercharger, and a torque converter is disposed between the engine and an automatic lo transmission, and provided with the lockup clutch, comprises: a controller configured to: set the clutch engagement force based on a measured value of torque inputted to the lockup clutch; determine whether the engine is operating in a predetermined supercharger lag region in which the measured value deviates from an actual value of the torque; and perform a first operation of correcting the clutch engagement force by reducing the clutch engagement force in response to determination that the engine is operating in the supercharger lag region.

According to another aspect of the present invention, a lockup clutch control method for controlling slippage of a lockup clutch to a desired slippage by manipulating clutch engagement force of the lockup clutch, wherein an engine is provided with a supercharger, and a torque converter is disposed between the engine and an automatic transmission, and provided with the lockup clutch, comprises: setting the clutch engagement force based on a measured value of torque inputted to the lockup clutch; determining whether the engine is operating in a predetermined supercharger lag region in which the measured value deviates from an actual value of the torque; and performing a first operation of correcting the clutch engagement force by reducing the clutch engagement force in response to determination that the engine is operating in the supercharger lag region.

BRIEF DESCRIPTION OF THE DRAWINGS

FIGS. 8A, 8B, 8C and 8D are time charts showing changes of throttle valve opening, measured engine torque, actual engine torque, desired slippage correction, and control phase through the sub-process of the lockup clutch control process during acceleration with a turbo lag caused.

DETAILED DESCRIPTION OF THE INVENTION

Figure 1:
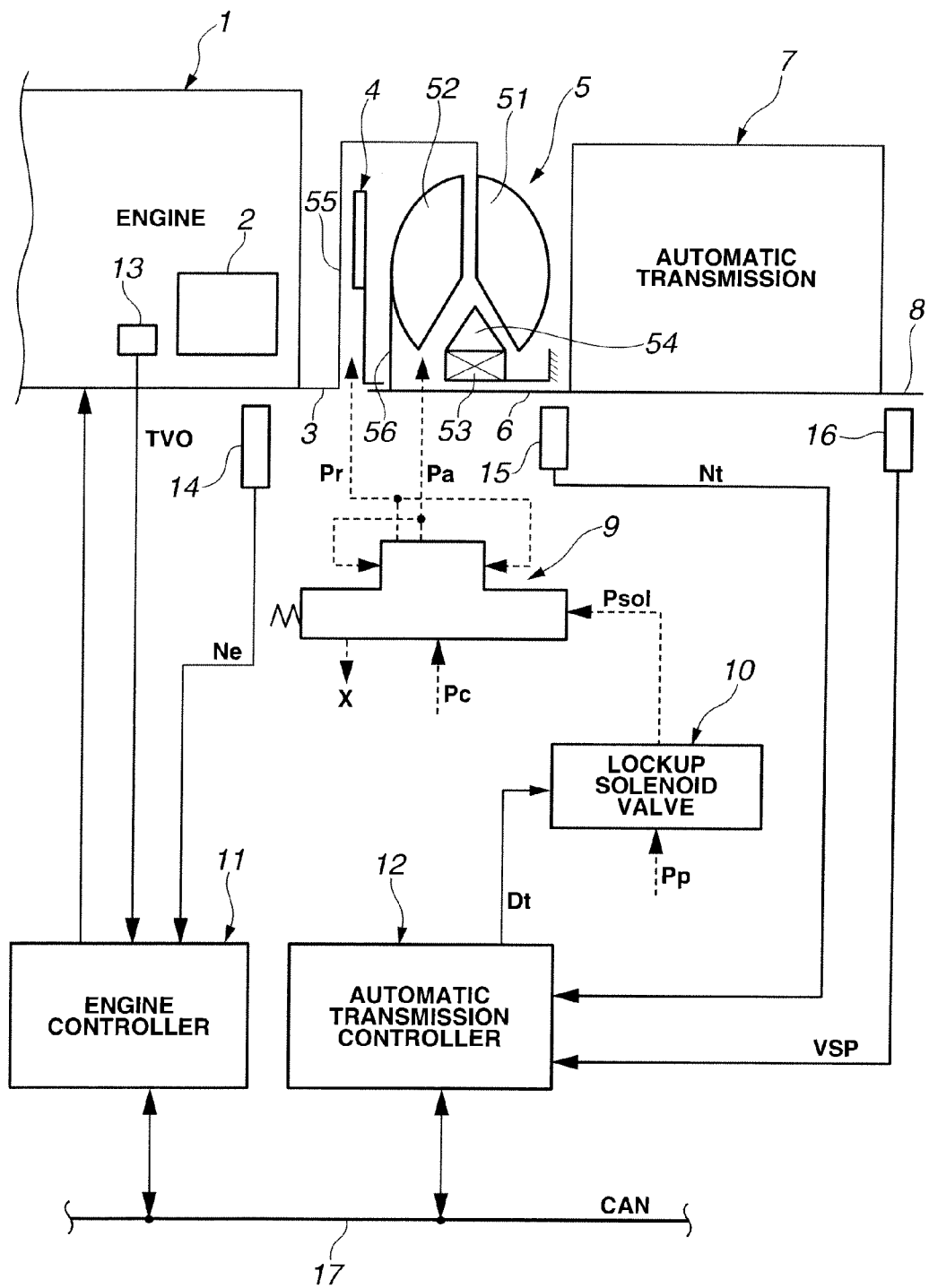
FIG. 1 is a schematic diagram showing a control system in which a lockup clutch control apparatus according to an embodiment of the present invention is applied to a powertrain system of a motor vehicle.

FIG. 1 schematically shows a control system in which a lockup clutch control apparatus according to an embodiment of the present invention is applied to a powertrain system of a motor vehicle.

The powertrain system includes an engine 1, an engine output shaft 3, a lockup clutch 4, a torque converter 5, a transmission input shaft 6, an automatic transmission 7, and a transmission output shaft 8. Engine 1 is provided with a supercharger 2. In this example, engine 1 is a diesel engine, and supercharger 2 is a turbocharger.

Torque converter 5 is arranged between diesel engine 1 and automatic transmission 7. Torque converter 5 includes a pump impeller 51, a turbine runner 52, a one-way clutch 53, a stator 54, a pump cover 55, and a turbine cover 56. Pump impeller 51 is arranged to rotate together with engine output shaft 3 as a solid unit. Turbine runner 52 is arranged to rotate together with transmission input shaft 6 as a solid unit. Stator 54 is provided between pump impeller 51 and turbine runner 52, and mounted to a housing through one-way clutch 53. A lockup clutch 4 is provided between pump cover 55 and turbine cover 56, and arranged to selectively connect and disconnect pump cover 55 and turbine cover 56 to each other so as to establish direct connection between the input side and output side of torque converter 5.

Lockup clutch 4 is controlled to bring torque converter 5 into a selected one of lockup state (state in which lockup clutch 4 is engaged completely), non-lockup state or release mode (state in which lockup clutch 4 is released completely), and slip lockup state (state in which lockup clutch 4 is engaged moderately and slipping). This selection is based on operating conditions of the engine and vehicle. The switching among these states of lockup clutch 4 and clutch engagement force (or clutch capacity) of lockup clutch 4 when in the lockup state or slip lockup state are controlled by means of a differential pressure between a torque converter apply pressure Pa and a torque converter release pressure Pr which are of front and rear chambers of lockup clutch 4.

The control system includes a lockup control valve 9, a lockup solenoid valve 10, an engine controller 11, an automatic transmission controller 12, a throttle valve opening sensor 13, an engine speed sensor 14, a turbine speed sensor (or transmission input speed sensor) 15, a vehicle speed sensor (or transmission output speed sensor) 16, and a CAN (Controller Area Network) communication line 17.

Lockup control valve 9 is configured to produce torque converter apply pressure Pa and torque converter release pressure Pr and thereby differential pressure $\Delta P$ ($\Delta P = Pa - Pr$) based on a torque converter pressure Pc in accordance with a solenoid valve pressure Psol as an operation signal.

Lockup solenoid valve 10 is configured to produce solenoid valve pressure Psol based on a constant pilot pressure Pp in accordance with a solenoid force as an operation signal wherein the solenoid force is produced by a duty signal Dt supplied from automatic transmission controller 12.

Engine controller 11 is configured to receive input of signals indicative of information about throttle valve opening TVO from throttle valve opening sensor 13, engine speed Ne from engine speed sensor 14, etc., and control the operating state of diesel engine 1 by fuel injection control, etc.

Automatic transmission controller 12 is configured to receive input of signals indicative of information about turbine speed Nt from turbine speed sensor 15, vehicle speed VSP from vehicle speed sensor 16, and control the operating state of automatic transmission 7 by gear shift control, slip lockup control, etc.

CAN communication line 17 connects engine controller 11, automatic transmission controller 12, and other on-board controllers to each other, and allows bidirectional signal communication among those controllers. Automatic transmission controller 12 obtains from engine controller 11 through CAN communication line 17 information about throttle valve opening TVO, engine speed Ne, measured engine torque Te_sen, etc.

Figure 2:
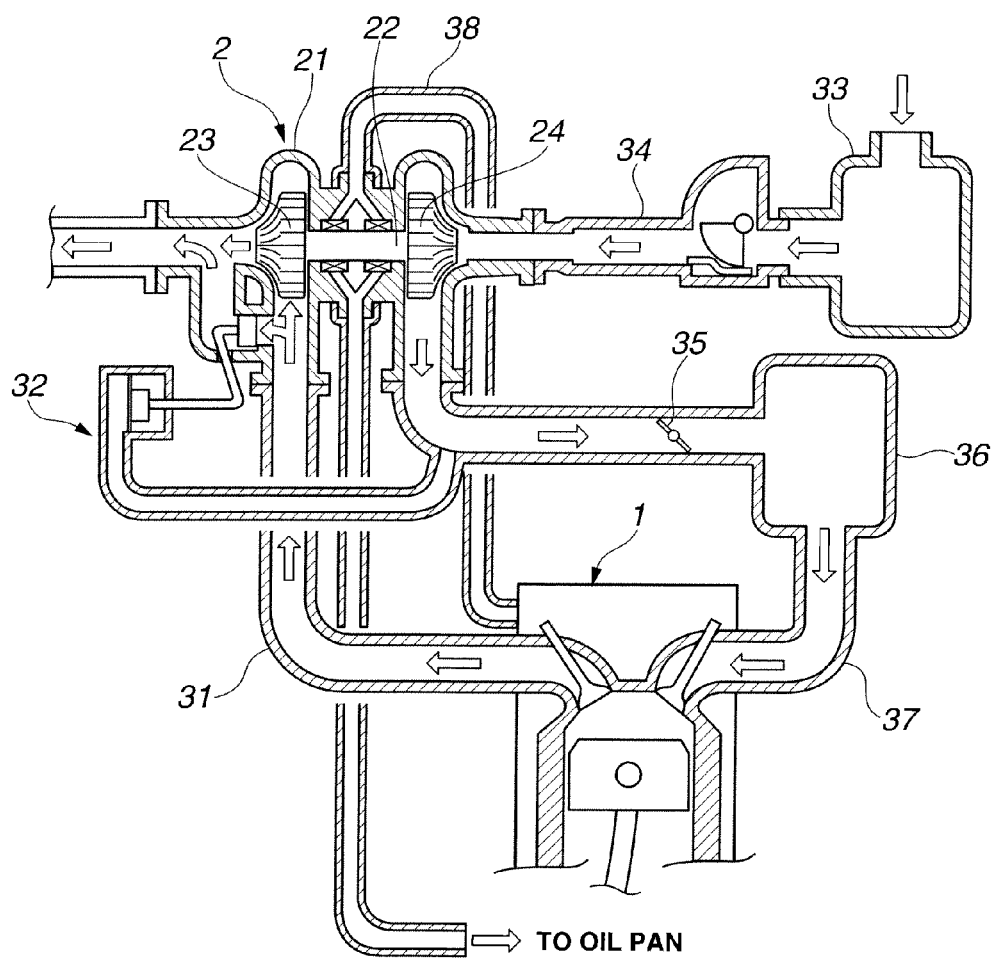
FIG. 2 is a schematic diagram showing a turbocharger provided in a diesel engine system to which the lockup clutch control apparatus according to the embodiment is applied.

FIG. 2 schematically shows construction of turbocharger 2. Turbocharger 2 includes a turbo housing 21, a wheel shaft 22, a turbine wheel 23, and a compressor wheel 24. Wheel shaft 22, turbine wheel 23, and compressor wheel 24 are mounted in turbo housing 21. Each of turbine wheel 23 and compressor wheel 24 includes vanes, and coupled to each other by wheel shaft 22.

Turbine wheel 23 is arranged in an exhaust passage connected to and downstream from diesel engine 1, and adapted to rotate by power of flow of exhaust gas. The exhaust passage includes an exhaust manifold 31 and a waste gate 32. Waste gate 32 serves to guide part of exhaust gas into another branched passage, and thereby adjust an amount of exhaust gas striking the turbine wheel 23.

Compressor wheel 24 is arranged in an intake passage leading to diesel engine 1, and adapted to rotate with rotation of turbine wheel 23. This rotation of compressor wheel 24 produces a centrifugal force to compress intake air. The intake passage is provided with an air cleaner 33, an intake air passage 34, a throttle valve 35, an intercooler 36, and an intake manifold 37. Intercooler 36 serves to cool compressed intake air. Since wheel shaft 22 rotates at extremely high speed, wheel shaft 22 is provided with a bearing to which cooling oil is supplied through a cooling oil passage 38.

Figure 3:
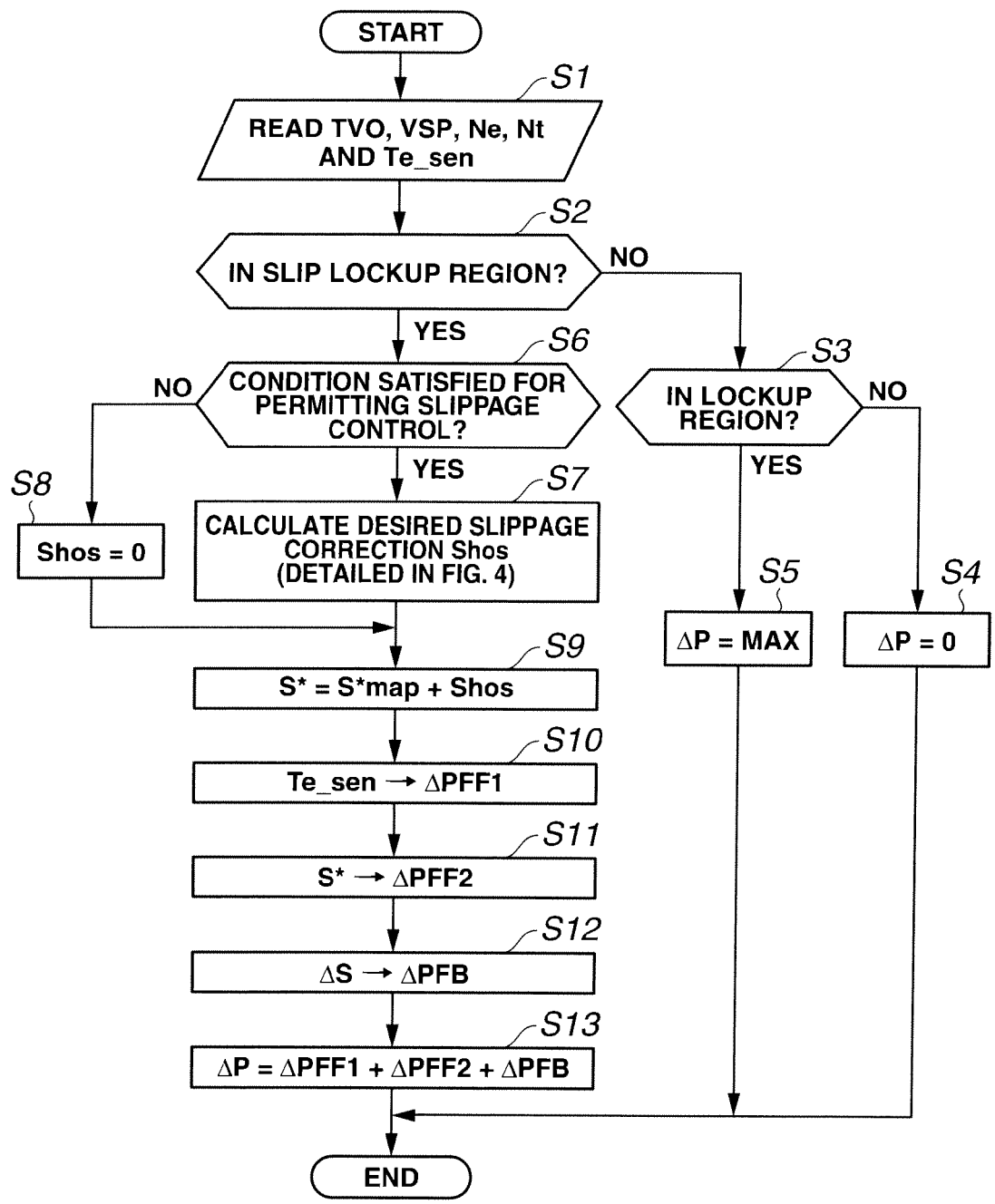
FIG. 3 is a flow chart showing a lockup clutch control process to be carried out by an automatic transmission controller according to the embodiment.

FIG. 3 is a flow chart showing a lockup clutch control process to be carried out by automatic transmission controller 12. This process is repeatedly executed at intervals of a predetermined control cycle.

At Step S1, automatic transmission controller 12 reads information about throttle valve opening TVO, vehicle speed VSP, engine speed Ne, turbine speed Nt, measured engine torque Te_sen, etc. Then, automatic transmission controller 12 proceeds to Step S2. Measured engine torque Te_sen is a measured value of torque inputted to lockup clutch 4, which is obtained with reference to a predetermined engine torque map prepared experimentally or the like in which steady-state engine torque is mapped with respect to fuel injection quantity.

At Step S2, automatic transmission controller 12 determines whether or not a current operating point of the vehicle (TVO, VSP) is in a predetermined slip lockup region. The slip lockup region is defined in a predetermined lockup map. When the answer to Step S2 is affirmative (YES), namely, when it is determined that the operating point is in the slip lockup region, then automatic transmission controller 12 proceeds to Step S6. On the other hand, when the answer to Step S2 is negative (NO), namely, when it is determined that the operating point is not in the slip lockup region, then automatic transmission controller 12 proceeds to Step S3. In this example, the lockup map is a map based on a transmission shift map in which upshift lines and downshift lines are defined in a coordinate system defined by throttle valve opening TVO and vehicle speed VSP, and in which the slip lockup region, lockup region, and non-lockup region are defined in this transmission shift map.

At Step S3, automatic transmission controller 12 determines whether or not the operating point (TVO, VSP) of the vehicle is in the lockup region in the lockup map. When the answer to Step S3 is YES, namely, when it is determined that the operating point is in the lockup region, then automatic transmission controller 12 proceeds to Step S5. On the other hand, when the answer to Step S3 is NO, namely, when it is determined that the operating point is not in the lockup region, i.e. is in the non-lockup region, then automatic transmission controller 12 proceeds to Step S4.

At Step S4, automatic transmission controller 12 outputs a duty signal Dt to lockup solenoid valve 10 so as to set differential pressure $\Delta P$ of lockup clutch 4 to zero, and thereby release the lockup clutch 4. Then automatic transmission controller 12 returns from this control process.

At Step S5, automatic transmission controller 12 outputs a duty signal Dt to lockup solenoid valve 10 so as to set differential pressure $\Delta P$ of lockup clutch 4 to maximum, and thereby completely engage the lockup clutch 4. Then automatic transmission controller 12 returns from this control process.

At Step S6, automatic transmission controller 12 determines whether or not a predetermined control permission condition is satisfied. When the answer to Step S6 is YES, namely, when it is determined that the control permission condition is satisfied, then automatic transmission controller 12 proceeds to Step S7. On the other hand, when the answer to Step S6 is NO, namely, when it is determined that the control permission condition is not satisfied, then automatic transmission controller 12 proceeds to Step S8. The control permission condition is a condition indicating that the engine is in a supercharger lag state in which a driver depresses an accelerator pedal with an intention to accelerate the vehicle so that the engine shifts from a precharge stage to a preparation stage, and the deviation between measured engine torque Te_sen and actual engine torque Te gets significant. Specifically, the control permission condition is based on the following three sub-conditions:

(a) $TVO \geq a1$
(b) $dTVO \geq a2$
(c) $Nt \leq a3$ wherein:

TVO represents throttle valve opening;

dTVO represents rate of change of throttle valve opening;

Nt represents turbine speed; and a1, a2 and a3 represent first, second and third threshold values.

When all of the conditions (a), (b) and (c) are satisfied, it is determined that the control permission condition is satisfied, namely, it is determined that the engine is being operated with a supercharger lag. On the other hand, when at least one of the conditions (a), (b) and (c) is unsatisfied, it is determined that the control permission condition is unsatisfied, namely, it is determined that the engine is being operated with no supercharger lag.

Figure 4:
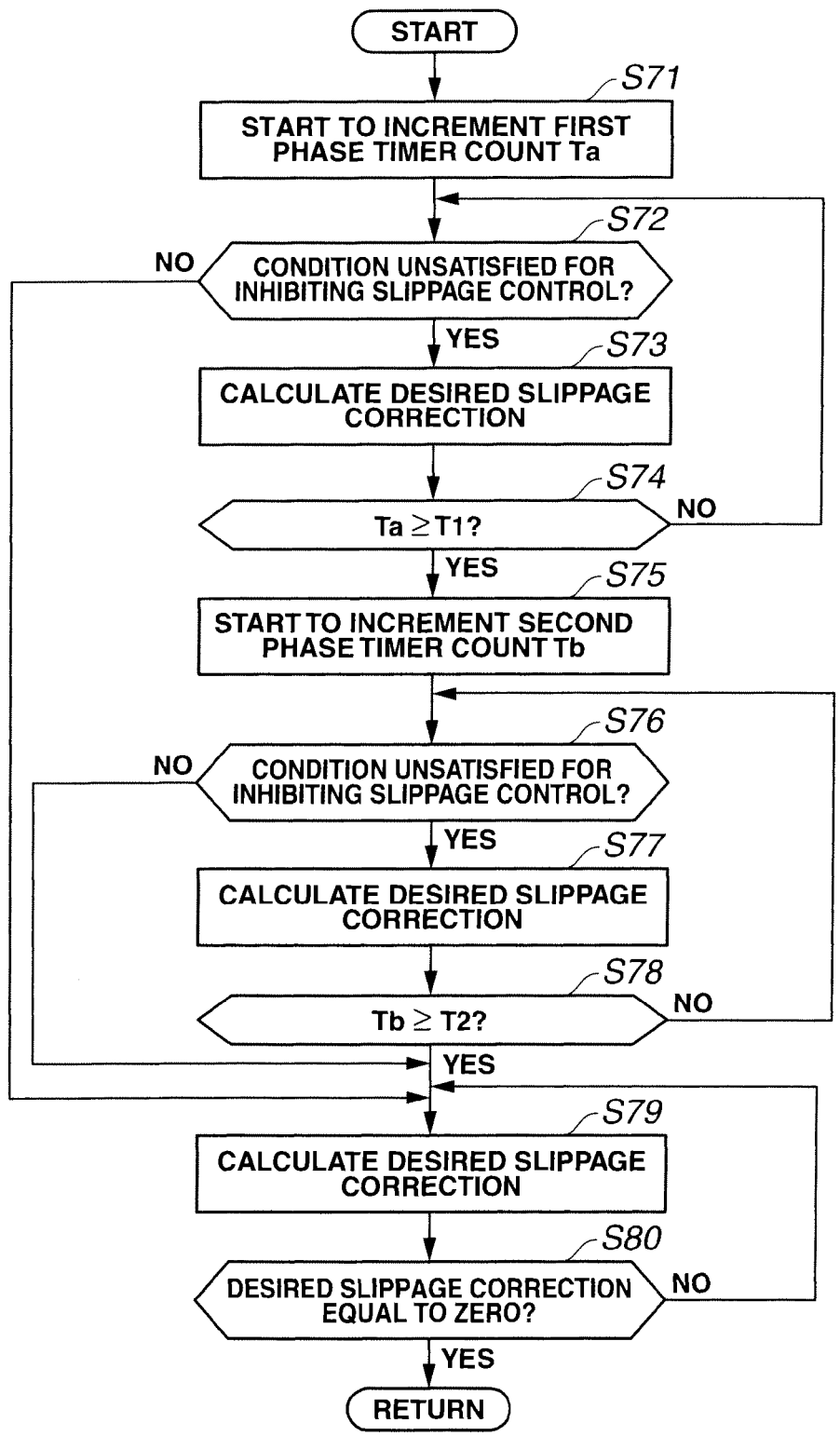
FIG. 4 is a flow chart showing a sub-process of the lockup clutch control process for calculating a desired slippage correction.

At Step S7, automatic transmission controller 12 calculates a desired slippage correction "Shos". Then automatic transmission controller 12 proceeds to Step S9. This calculation is shown in FIG. 4 and described in detail below.

At Step S8, automatic transmission controller 12 sets the desired slippage correction Shos to zero. Then automatic transmission controller 12 proceeds to Step S9.

At Step S9, automatic transmission controller 12 calculates a desired slippage S* by summing a map-derived desired slippage S*map and desired slippage correction Shos. Then automatic transmission controller 12 proceeds to Step S10. Map-derived desired slippage S*map is derived from a predetermined muffled noise suppression map. The muffled noise suppression map is a map in which desired slippage is mapped with respect to vehicle speed VSP, throttle valve opening TVO, torque converter oil temperature, etc. so as to minimize torque fluctuation and/or muffled noise.

At Step S10, automatic transmission controller 12 calculates a first feedforward differential pressure $\Delta PFF1$ corresponding to measured engine torque Te_sen based on the fuel injection quantity. Then automatic transmission controller 12 proceeds to Step S11.

At Step S11, automatic transmission controller 12 calculates a second feedforward differential pressure $\Delta PFF2$ corresponding to desired slippage S* calculated at Step S9. Then automatic transmission controller 12 proceeds to Step S12.

At Step S12, automatic transmission controller 12 calculates a feedback differential pressure $\Delta PFB$ corresponding to a slippage deviation $\Delta S$. Then automatic transmission controller 12 proceeds to Step S13. Slippage deviation $\Delta S$ is calculated by calculating an actual slippage S as a difference between engine speed Ne and turbine speed Nt, and then subtracting the actual slippage S from desired slippage S*.

At Step S13, automatic transmission controller 12 calculates differential pressure $\Delta P$ of lockup clutch 4 by summing the first feedforward differential pressure $\Delta PFF1$, second feedforward differential pressure $\Delta PFF2$, and feedback differential pressure $\Delta PFB$, and then outputs a duty signal Dt to lockup solenoid valve 10 for obtaining the calculated differential pressure $\Delta P$. Then automatic transmission controller 12 returns from this control process.

FIG. 4 is a flow chart showing a sub-process of the lockup clutch control process for calculating desired slippage correction Shos.

At Step S71, automatic transmission controller 12 starts a first phase timer by starting to increment a first phase timer count Ta. Then automatic transmission controller 12 proceeds to Step S72.

At Step S72, automatic transmission controller 12 determines whether or not a predetermined control inhibition condition is unsatisfied. When the answer to Step S72 is YES, namely, when it is determined that the control inhibition condition is unsatisfied, then automatic transmission controller 12 proceeds to Step S73. On the other hand, when the answer to Step S72 is NO, namely, when it is determined that the control inhibition condition is satisfied, then automatic transmission controller 12 proceeds to Step S79. The control inhibition condition is a condition indicating that the engine is in a state causing no supercharging or in a state in which the input torque (engine torque) is already enhanced by supercharging. Specifically, the control inhibition condition is based on the following two sub-conditions:

(d) TVO≤a4

(e) Nt≥a5 wherein a4 and a5 represent fourth and fifth threshold values.

When both of the conditions (d) and (e) are unsatisfied, it is determined that the control inhibition condition is unsatisfied. On the other hand, when at least one of the conditions (d) and (e) is satisfied, it is determined that the control inhibition condition is satisfied.

At Step S73, automatic transmission controller 12 calculates the desired slippage correction Shos by a method for the first phase. Then, automatic transmission controller 12 proceeds to Step S74. The desired slippage correction Shos is calculated using the following equation (1).

$$Shos=\min(Shos\_0+\Delta Shos1, Shos\_max1) \quad (1)$$

wherein:

Shos represents a desired slippage correction;

Shos_0 represents a preceding value of desired slippage correction;

$\Delta Shos1$ represents a first phase correction increment; and

Shos_max1 represents a first phase maximum correction.

First phase correction increment $\Delta Shos1$ and first phase maximum correction Shos_max1 are set to predetermined constant values which are derived experimentally or the like.

Figure 5:
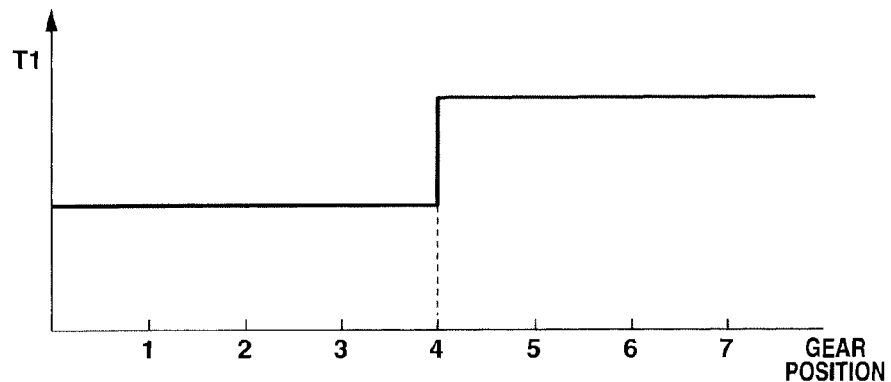
FIG. 5 is a graphic diagram showing a relationship between gear position and a first timer count value for a first phase timer, which is employed in the sub-process of the lockup clutch control process.

At Step S74, automatic transmission controller 12 determines whether or not first phase timer count Ta is above a first timer count value T1. When the answer to Step S74 is YES, namely, when it is determined that first phase timer count Ta is above the first timer count value T1, then automatic transmission controller 12 proceeds to Step S75. On the other hand, when the answer to Step S74 is NO, namely, when it is determined that first phase timer count Ta is not above the first timer count value T1, then automatic transmission controller 12 returns to Step S72. As shown in FIG. 5, first timer count value T1 is set relatively small when the gear position is identical to one of first to fourth gear ratios so that the rate of increase of engine speed is relatively fast. On the other hand, first timer count value T1 is set relatively large when the gear position is identical to one of fifth to seventh gear ratios so that the rate of increase of engine speed is relatively slow. This is because the period in which supercharger lag state continues decreases as the rate of increase of engine speed increases.

At Step S75, automatic transmission controller 12 starts a second phase timer by starting to increment a second phase timer count Tb. Then automatic transmission controller 12 proceeds to Step S76.

At Step S76, automatic transmission controller 12 determines whether or not the control inhibition condition is unsatisfied. When the answer to Step S76 is YES, namely, when it is determined that the control inhibition condition is unsatisfied, then automatic transmission controller 12 proceeds to Step S77. On the other hand, when the answer to Step S76 is NO, namely, when it is determined that the control inhibition condition is satisfied, then automatic transmission controller 12 proceeds to Step S79. The control inhibition condition is common for Steps S72 and S76.

At Step S77, automatic transmission controller 12 calculates the desired slippage correction Shos by a method for the second phase. Then, automatic transmission controller 12 proceeds to Step S78. The desired slippage correction Shos is calculated using the following equation (2):

$$Shos = \max(Shos\_0 + \Delta Shos2, Shos\_min2) \quad (2)$$

wherein:
Shos represents a desired slippage correction;
Shos_0 represents a preceding value of desired slippage correction;
$\Delta Shos2$ represents a second phase correction increment; and
Shos_min2 represents a second phase minimum correction.

Figure 6:
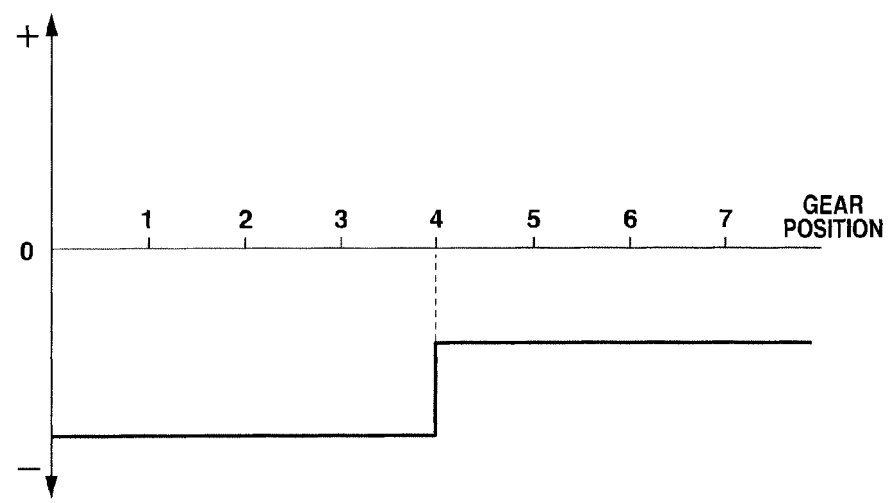
FIG. 6 is a graphic diagram showing a relationship between gear position and a second phase correction increment, which is employed in the sub-process of the lockup clutch control process.
Figure 7:
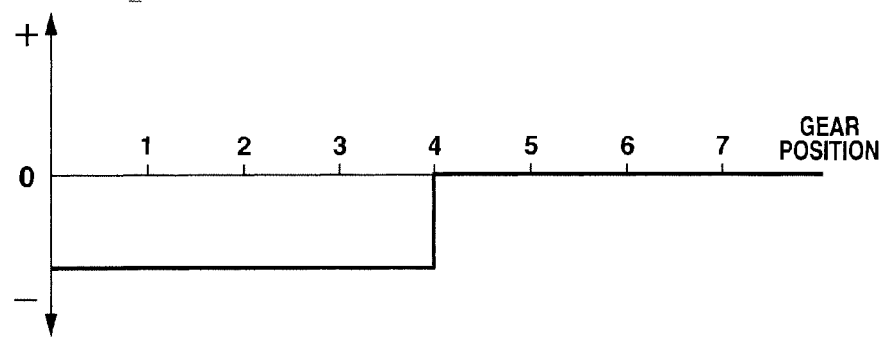
FIG. 7 is a graphic diagram showing a relationship between gear position and a second phase minimum correction, which is employed in the sub-process of the lockup clutch control process.

Second phase correction increment $\Delta Shos2$ and second phase minimum correction Shos_min2 are set to predetermined constant values which are derived experimentally or the like. Second phase correction increment $\Delta Shos2$ is negative, while first phase correction increment $\Delta Shos1$ is positive. Moreover, the absolute value of second phase correction increment $\Delta Shos2$ is set smaller than that of first phase correction increment $\Delta Shos1$. As shown in FIG. 6, second phase correction increment $\Delta Shos2$ is set to a negative value whose absolute value is relatively large when the gear position is identical to one of first to fourth gear ratios so that the rate of increase of engine speed is relatively fast. On the other hand, second phase correction increment $\Delta Shos2$ is set to a negative value whose absolute value is relatively small when the gear position is identical to one of fifth to seventh gear ratios so that the rate of increase of engine speed is relatively slow. As shown in FIG. 7, second phase minimum correction Shos_min2 is set to a negative value whose absolute value is relatively large when the gear position is identical to one of first to fourth gear ratios so that the rate of increase of engine speed is relatively fast. On the other hand, second phase minimum correction Shos_min2 is set to a negative value whose absolute value is relatively small when the gear position is identical to one of fifth to seventh gear ratios so that the rate of increase of engine speed is relatively slow.

At Step S78, automatic transmission controller 12 determines whether or not second phase timer count Tb is above a second timer count value T2. When the answer to Step S78 is YES, namely, when it is determined that second phase timer count Tb is above the second timer count value T2, then automatic transmission controller 12 proceeds to Step S79. On the other hand, when the answer to Step S78 is NO, namely, when it is determined that second phase timer count Tb is not above the second timer count value T2, then automatic transmission controller 12 returns to Step S76. Second timer count value T2 is a predetermined constant value derived experimentally or the like.

At Step S79, automatic transmission controller 12 calculates the desired slippage correction Shos by a method for a closing phase. Then, automatic transmission controller 12 proceeds to Step S80. The desired slippage correction Shos is calculated using the following equation (3):

$$Shos = Shos\_0 - \max(\min(Shos\_0 - Shos\_t, Shos\_lim), Shos\_lim) \quad (3)$$

wherein:
Shos represents a desired slippage correction;
Shos_0 represents a preceding value of desired slippage correction;
Shos_t represents a target correction value; and
Shos_lim represents a limit of rate of change.

The target correction value Shos_t is set to zero, because no slippage correction is desired after the supercharger lag is eliminated. According to equation (3), the gap between target correction value Shos_t and the desired slippage correction Shos is gradually eliminated so that the desired slippage correction Shos gradually approaches the target correction value Shos_t of zero.

At Step S80, automatic transmission controller 12 determines whether or not the desired slippage correction Shos is equal to zero. When the answer to Step S80 is YES, namely, when it is determined that the desired slippage correction Shos is equal to zero, then automatic transmission controller 12 returns from this control process. On the other hand, when the answer to Step S80 is NO, namely, when it is determined that the desired slippage correction Shos is not equal to zero, then automatic transmission controller 12 returns to Step S79.

<Operation of Lockup Clutch Control Apparatus>
The lockup clutch control apparatus described above operates as described in the following items A1 to A5.

<A1. Problem(s) Confronted by Lockup Clutch Control for Turbocharged Engine> A turbocharged engine has a disadvantage of supercharger lag, called turbo lag. When an accelerator pedal is depressed with an intention to accelerate a vehicle, fuel injection quantity is increased so that the flow rate and kinetic energy of exhaust gas is increased, but the resultant increase in rotational speed of turbine wheel 23 is delayed due to its inertia. Then, the rotational speed of compressor wheel 24 rises so as to compress intake air by the centrifugal force by rotation of compressor wheel 24. Compressed intake air is brought into the suction side of diesel engine 1 so that the output torque of diesel engine 1 increases. In this way, there is a lag from the time instant of depression of the accelerator pedal to the time instant when the increase in the output torque of diesel engine 1 is realized by supercharging.

If slip lockup control for lockup clutch 4 is implemented only by feedback control, the response of the slip lockup control is late at a moment a supercharger lag occurs. On the other hand, if slip lockup control is implemented only by feedforward control, the convergence of actual slippage to desired slippage is adversely affected. In order to enhance the response at the time of occurrence of a supercharger lag and to enhance the convergence of actual slippage to desired slippage, slip lockup control is implemented by a combined control of the engagement pressure of lockup clutch 4 based on feedforward control based on information about input torque to lockup clutch 4 and feedback control based on slippage deviation.

It is ideal that the information about input torque to lockup clutch 4 for feedforward control gives an estimated transient value of engine torque on which a supercharger lag is reflected. However, it is practically difficult to accurately estimate the transient engine torque, because the transient engine torque is significantly affected by variations among individual products of the engine and operating conditions of the vehicle. Accordingly, the information about input torque to lockup clutch 4 is implemented by a steady-state measured value of engine torque.

Therefore, the actual engine torque inputted to lockup clutch 4 at the time of supercharger lag is smaller than the measured engine torque as shown in FIG. 8B in which a solid line represents the measured engine torque and a broken line represents the actual engine torque. If the engagement pressure of lockup clutch 4 is set by feedforward control based on measured engine torque, the engagement pressure is higher with respect to the actual engine torque than desired. This results in that the actual slippage of lockup clutch 4 is smaller than desired, and lockup clutch 4 is nearly locked up so that lockup clutch 4 fails to slip suitably.

Moreover, at the time of supercharger lag, the engagement pressure of lockup clutch 4 is set relatively small by feedback control because the actual slippage of lockup clutch 4 is smaller than desired. When the engine torque rises after the supercharger lag, the engagement pressure of lockup clutch 4 is too small with respect to the actual engine torque. In addition, there is a response delay with the feedback control. As a result, the actual slippage of lockup clutch 4 is larger than desired, so that lockup clutch 4 may slip excessively.

In view of the foregoing, for engine 1 provided with turbocharger 2, it is desired to suitably compensate the engagement pressure of lockup clutch 4 for error in the measured engine torque Te_sen due to supercharger lag, so as to control the slippage of lockup clutch 4 quickly as desired.

<A2. Lockup Clutch Control in Each Control Mode> The following describes specific operation of the lockup clutch control apparatus in each control mode with reference to the flow chart of FIG. 3.

In the release mode, the control process proceeds through Steps S1, S2, S3 and S4 in the flow chart of FIG. 3 repeatedly. At Step S4, the duty signal Dt for setting the differential pressure $\Delta P$ for lockup clutch 4 to zero is outputted to lockup solenoid valve 10, so as to release lockup clutch 4.

In the lockup mode, the control process proceeds through Steps S1, S2, S3 and S5 in the flow chart of FIG. 3 repeatedly. At Step S5, the duty signal Dt for setting the differential pressure $\Delta P$ for lockup clutch 4 to maximum is outputted to lockup solenoid valve 10, so as to engage lockup clutch 4 completely.

When the control system is in the slip lockup mode and the control permission condition for slippage correction is unsatisfied, the control process proceeds through Steps S1, S2, S6, S8, S9, S10, S11, S12 and S13 in the flow chart of FIG. 3 repeatedly. At Step S9, the desired slippage correction Shos is equal to zero, so that the desired slippage $S^*$ is equal to map-derived desired slippage $S^*$map based on the muffled noise suppression map. Namely, when it is unnecessary to take account of supercharger lag, normal slip lockup control is performed without correcting the desired slippage $S^*$ by non-zero desired slippage correction Shos.

On the other hand, when the control system is in the slip lockup mode and the control permission condition is satisfied, the control process proceeds through Steps S1, S2, S6, S7, S9, S10, S11, S12 and S13 in the flow chart of FIG. 3 repeatedly. At Step S7, the desired slippage correction Shos is calculated through the flow chart of FIG. 4. Then, at Step S9, the desired slippage $S^*$ is calculated by summing the map-derived desired slippage $S^*$map based on the muffled noise suppression map and the desired slippage correction Shos. Namely, when it is appropriate to take account of supercharger lag, exceptional slip lockup control is performed in which the desired slippage $S^*$ is corrected by non-zero desired slippage correction Shos so as to compensate the engagement pressure of lockup clutch 4 for error in the measured engine torque Te_sen due to supercharger lag.

In the slip lockup mode, at Step S10, first feedforward differential pressure $\Delta$PFF1 corresponding to the fuel injection quantity is calculated, whenever the control permission condition is satisfied or unsatisfied. Then, at Step S11, the second feedforward differential pressure $\Delta$PFF2 corresponding to the desired slippage $S^*$ calculated at Step S9 is calculated. Then, at Step S12, the feedback differential pressure $\Delta$PFB corresponding to the slippage deviation $\Delta S$ is calculated. Then, at Step S13, the differential pressure $\Delta P$ for lockup clutch 4 is calculated by summing the first feedforward differential pressure $\Delta$PFF1, second feedforward differential pressure $\Delta$PFF2, and the feedback differential pressure $\Delta$PFB. Then, the duty signal Dt to achieve the calculated differential pressure $\Delta P$ is outputted to lockup solenoid valve 10. Namely, the engagement force of lockup clutch 4 is controlled by a combined control based on feedforward control based on measured engine torque Te_sen and desired slippage $S^*$, and feedback control based on slippage deviation $\Delta S$. This serves to quickly bring the lockup clutch 4 into desired slip lockup state at the time of start of the lockup clutch control, and also ensure the convergence of actual slippage to desired slippage.

<A3. Slippage Correction in First Phase> The slippage correction in the first phase serves to reduce the engagement force of lockup clutch 4 during a certain period from start of occurrence of supercharger lag, taking account of supercharger lag characterized in turbocharged engine 1.

At Step S6 in the flow chart of FIG. 3, the control permission condition is checked for determining whether or not the engine system is in supercharger lag state in which the deviation between the measured engine torque Te_sen and the actual engine torque is significant. The control permission condition is based on the three sub-conditions of TVO≥a1, dTVO≥a2 and Nt≤a3. It is determined that the control permission condition is satisfied, when all of the three sub-conditions are satisfied. The control permission condition for detecting a shift from pre-supercharging stage to supercharging preparation stage is reflected by an event that a driver depresses the accelerator pedal with an intention to accelerate the vehicle.

This serves to accurately estimate that the engine enters a supercharger lag state.

When it is determined that the engine is in supercharger lag state, the control process proceeds through Steps S71, S72, S73 and Step S74 in the flow chart of FIG. 4, wherein the calculation of desired slippage correction Shos for the first phase is started. As long as the control inhibition condition is unsatisfied and the first phase timer count Ta is below the first timer count value T1, the process through Steps S72, S73 and S74 in the flow chart of FIG. 4 is repeated.

Specifically, at Step S73, the desired slippage correction Shos is calculated using the method for the first phase using the above equation (1). According to this calculation, the desired slippage correction Shos gradually increases at a positive gradient of the first phase correction increment $\Delta$Shos1 from a time instant t1 to a time instant t2 as shown in FIG. 8C. The desired slippage correction Shos reaches the first phase maximum correction Shos_max1 at time instant t2, and then is held constant at the first phase maximum correction Shos_max1 from time instant t2 to a time instant t3.

According to the above calculation, in response to detection of supercharger lag, the desired slippage $S^*$ of lockup clutch 4 is corrected so that the engagement force of lockup clutch 4 is set smaller than the engagement force set based on the measured engine torque Te_sen. This serves to conform the engagement force of lockup clutch 4 to the engagement force corresponding to the actual engine torque, and thereby suppress the actual slippage S from getting smaller than desired. In this way, the lockup clutch control apparatus according to the embodiment can enhance the accuracy of the slip lockup control for lockup clutch 4.

At Step S74, it is determined whether or not the first phase timer count Ta is above first timer count value T1, wherein as shown in FIG. 5, first timer count value T1 is set relatively small when the gear position is identical to one of first to fourth gear ratios so that the rate of increase of engine speed is relatively fast. On the other hand, first timer count value T1 is set relatively large when the gear position is identical to one of fifth to seventh gear ratios so that the rate of increase of engine speed is relatively slow. This is because the period in which supercharger lag state continues increases as the gear ratio decreases (or as the gear position becomes higher) even with the same throttle valve opening TVO. In this way, the feature of setting the first timer count value T1 (i.e. the period of the first phase) depending on the gear position indicating the rate of increase of engine speed, serves to suitably suppress the actual slippage S of lockup clutch 4 from becoming smaller than desired.

<A4. Slippage Correction in Second Phase> If the engine torque increases while the engagement force of lockup clutch 4 is held smaller after occurrence of supercharger lag, the slippage of lockup clutch 4 tends to be excessively large. Accordingly, it is appropriate to correct the engagement force of lockup clutch 4 by increasing the same. The slippage correction in the second phase serves to solve this problem specifically as follows.

When it is determined that first phase timer count Ta is above first timer count value T1, the process proceeds through Steps S75, S76, S77 and S78 in the flow chart of FIG. 4 where the calculation of desired slippage correction Shos for the second phase is started. As long as the control inhibition condition is unsatisfied and the second phase timer count Tb is below the second timer count value T2, the process through Steps S76, S77 and S78 in the flow chart of FIG. 4 is repeated.

Specifically, at Step S77, the desired slippage correction Shos is calculated using the method for the second phase using the above equation (2). According to this calculation, the desired slippage correction Shos gradually decreases at a descending gradient of the second phase correction increment ΔShos2 from time instant t3 to a time instant t4 as shown in FIG. 8C. The desired slippage correction Shos reaches the second phase minimum correction Shos_min2 at time instant t4, and then is held constant at the second phase minimum correction Shos_min2 from time instant t4 to a time instant t5. This feature serves to suppress the actual slippage S of lockup clutch 4 from exceeding the desired slippage S*, when the first timer count value T1 is reached after start of supercharger lag, which indicates elimination of supercharger lag and increase in the actual engine torque.

In this embodiment, in consideration of the relationship between the measured engine torque and the actual engine torque as shown in FIG. 8B, the first timer count value Ti is set so that the reduction of the desired slippage correction Shos is started to increase the engagement force of lockup clutch 4 at time instant t3 before the deviation between the measured engine torque Te_sen and the actual engine torque reaches substantially zero. Theoretically, it is preferable that the increase of the engagement force of lockup clutch 4 is started at a time instant when the deviation between the measured engine torque Te_sen and the actual engine torque reaches zero. However, this theoretical operation may cause a condition that the engagement force of lockup clutch 4 is too small with respect to the actual engine torque, because of delay in response of the engagement force of lockup clutch 4. This may cause the engine speed to increase excessively, namely, cause the actual slippage S of lockup clutch 4 to exceed the desired slippage S*, when the deviation between the measured engine torque Te_sen and the actual engine torque reaches zero. This problem is solved by the feature according to the embodiment of starting the increase of the engagement force of lockup clutch 4 before the deviation between the measured engine torque Te_sen and the actual engine torque reaches substantially zero.

Moreover, in the present embodiment, the correction of the desired slippage S* for increasing the engagement force of lockup clutch 4 during the period from time instant t3 to time instant t4 is implemented by a smaller gradient (or a smaller rate of change) than the correction of the desired slippage S* for reducing the engagement force of lockup clutch 4 during the period from time instant t1 to time instant t2. When a supercharger lag occurs, it is desirable to quickly reduce the engagement force of lockup clutch 4. On the other hand, it is generally difficult to accurately estimate the timing when the supercharger lag is eliminated or when the deviation between the measured engine torque Te_sen and the actual engine torque reaches substantially zero, because this timing varies according to conditions of the vehicle. Accordingly, if the correction of the desired slippage S* for increasing the engagement force of lockup clutch 4 during the period from time instant t3 to time instant t4 is implemented by the same rapid gradient (or same rate of change) as the correction of the desired slippage S* for reducing the engagement force of lockup clutch 4 during the period from time instant t1 to time instant t2 in contrast to the present embodiment, the slippage correction of the second phase may cause lockup clutch 4 to be completely engaged, and the slippage of lockup clutch 4 to be eliminated. This problem is solved by the feature of the present embodiment described above.

Moreover, while the desired slippage S* is corrected so as to increase the engagement force of lockup clutch 4 after first timer count value T1 is reached, second phase correction increment ΔShos2 is set to a negative value whose absolute value is relatively large so that the engagement force of lockup clutch 4 increases relatively quickly, when the gear position is identical to one of first to fourth gear ratios so that the rate of increase of engine speed is relatively fast, as shown in FIG. 6. On the other hand, second phase correction increment ΔShos2 is set to a negative value whose absolute value is relatively small so that the engagement force of lockup clutch 4 increases relatively slowly, when the gear position is identical to one of fifth to seventh gear ratios so that the rate of increase of engine speed is relatively slow. As the gear ratio decreases, or as the gear position becomes higher, the rate of increase of engine speed Ne with respect to the same throttle valve opening TVO decreases so that the increase of the engine torque due to supercharging decreases. In consideration of this fact, the feature of the present embodiment described above serves to suitably control the actual slippage S of lockup clutch 4 as desired.

Still moreover, while the desired slippage S* is corrected so as to increase the engagement force of lockup clutch 4 after first timer count value T1 is reached, second phase minimum correction Shos_min2 is set to a negative value whose absolute value is relatively large so that the engagement force of lockup clutch 4 is relatively large, when the gear position is identical to one of first to fourth gear ratios so that the rate of increase of engine speed is relatively fast, as shown in FIG. 7. On the other hand, second phase minimum correction Shos_min2 is set to a negative value whose absolute value is relatively small so that the engagement force of lockup clutch 4 is relatively small. when the gear position is identical to one of fifth to seventh gear ratios so that the rate of increase of engine speed is relatively slow. During the period of supercharger lag, the desired slippage S* is corrected by increasing the same so as to reduce the engagement force of lockup clutch 4. After the period of supercharger lag, the desired slippage S* is corrected by reducing the same so as to increase the engagement force of lockup clutch 4, wherein the desired slippage S* is set smaller than in steady state during the period of the second phase in order to ensure quick response of the engagement force and slippage of lockup clutch 4. At this time, as the gear ratio increases, or as the gear position becomes lower, the rate of increase of engine speed Ne with respect to the same throttle valve opening TVO increases so that the increase of the engine torque due to supercharging increases. In consideration of this fact, the feature of the present embodiment described above serves to ensure quick response of the engagement force and slippage of lockup clutch 4 when the engagement force of lockup clutch 4 is increased while the gear ratio is relatively large.

<A5. Slippage Correction in Closing Phase> At the time when the second phase terminates, it is possible that the desired slippage correction Shos is not equal to zero. Accordingly, the closing phase serves to close the slippage correction without causing rapid change of the desired slippage correction Shos.

When it is determined that second phase timer count Tb is above second timer count value T2, the process proceeds through Steps S78, S79 and S80 in the flow chart of FIG. 4 where the calculation of desired slippage correction Shos for the closing phase is started. As long as it is determined at Step S80 that the desired slippage correction Shos is not equal to zero, the process through Steps S79 and S80 in the flow chart of FIG. 4 is repeated.

Specifically, at Step S79, the desired slippage correction Shos is calculated using the method for the closing phase using the above equation (3). According to this calculation, the desired slippage correction Shos gradually increases at a gradient of the limit of rate of change Shos_lim from time instant t5 to a time instant t6 as shown in FIG. 8C. The desired slippage correction Shos reaches the target correction value Shos_t (=0) at time instant t6, and then is held constant at the target correction value Shos _t (=0), by which the desired slippage correction control is closed. This feature serves to gradually conform the desired slippage correction Shos to zero without undesirable torque fluctuations, while preventing rapid change of the desired slippage correction Shos after the slippage correction of the second phase. This is effective also in situations where the control inhibition condition is satisfied during the second phase so that the second phase is discontinued before completion.

<Features and Produced Effects> The lockup clutch control apparatus according to the present embodiment described above produces advantageous effects as follows.

<1> A lockup clutch control apparatus for controlling slippage (S) of a lockup clutch (4) to a desired slippage (S*) by manipulating clutch engagement force ($\Delta P$) of the lockup clutch (4), wherein an engine (diesel engine 1) is provided with a supercharger (turbocharger 2), and a torque converter (5) is disposed between the engine (1) and an automatic transmission (7), and provided with the lockup clutch (4), includes: a controller (automatic transmission controller 12) configured to: set the clutch engagement force ($\Delta P$) based on a measured value of torque (measured engine torque Te_sen) inputted to the lockup clutch (4) (Steps S10-513); determine whether the engine (1) is operating in a predetermined supercharger lag region in which the measured value (Te_sen) deviates from an actual value of the torque (actual engine torque Te) (Step S6); and perform a first operation (Steps S7, S9, FIG. 4) of correcting the clutch engagement force ($\Delta P$) by reducing the clutch engagement force ($\Delta P$) in response to determination that the engine (1) is operating in the supercharger lag region. This feature serves to enhance the accuracy of the slip lockup control of lockup clutch 4 at the time of supercharger lag.

<2> The lockup clutch control apparatus is configured so that the controller (12) is further configured to perform a second operation (S75, S76, S77, S78) of correcting the clutch engagement force ($\Delta P$) by setting the clutch engagement force ($\Delta P$) larger when a preset time period (first timer count value T1) is elapsed after determination that the engine (1) is operating in the supercharger lag region than before the time period (T1) is elapsed. This feature serves to suppress the actual slippage S of lockup clutch 4 from exceeding the desired slippage S* when the engine torque is increased after termination of supercharger lag.

<3> The lockup clutch control apparatus is configured so that the time period (T1) is set so that the controller (12) starts the second operation (S75, S76, S77, S78) before the deviation between the measured value (Te_sen) and the actual value (Te) reaches about zero after determination that the engine (1) is operating in the supercharger lag region. This feature serves to suppress undesirable overshooting of engine speed Ne when the deviation between the measured engine torque Te_sen and the actual engine torque becomes substantially zero.

<4> The lockup clutch control apparatus is configured so that the controller (12) is further configured to implement the second operation (S75, S76, S77, S78) by changing the clutch engagement force ($\Delta P$) with time more slowly than when implementing the first operation (S71, S72, S73, S74) by changing the clutch engagement force ($\Delta P$) with time. This feature serves to prevent lockup clutch 4 from being completely engaged because of variation in timing, when correcting the engagement force of lockup clutch 4 by increasing the same after the period of supercharger lag.

<5> The lockup clutch control apparatus is configured so that the controller (12) is further configured to implement the second operation (S75, S76, S77, S78) by changing the clutch engagement force ($\Delta P$) with time more slowly when a rate of increase of engine speed of the engine (1) is relatively slow than when the rate of increase of engine speed of the engine (1) is relatively fast (second phase correction change $\Delta$Shos2, FIG. 6). This feature serves to suitably converge the actual slippage S of lockup clutch 4 to the desired slippage S* taking account of the rate of increase of engine speed Ne when increasing the engagement force of lockup clutch 4 after the period of supercharger lag.

<6> The lockup clutch control apparatus is configured so that the controller (12) is further configured to implement the second operation (S75, S76, S77, S78) by setting the clutch engagement force ($\Delta P$) more larger when a rate of increase of engine speed of the engine (1) is relatively fast than when the rate of increase of engine speed of the engine (1) is relatively slow (second phase minimum correction Shos_min2, FIG. 7). This feature serves to ensure high response of the increase of the actual slippage S of lockup clutch 4 to the desired slippage S* taking account of the rate of increase of engine speed Ne when increasing the engagement force of lockup clutch 4 after the period of supercharger lag.

<7> The lockup clutch control apparatus is configured so that the controller (12) is further configured to perform the first operation (S71, S72, S73, S74) for a longer time period (T1) when a rate of increase of engine speed of the engine (1) is relatively slow than when the rate of increase of engine speed of the engine (1) is relatively fast. This feature serves to suppress the actual slippage S of lockup clutch 4 to fall below the desired slippage S* taking account of the rate of increase of engine speed Ne during the period of supercharger lag.

<8> The lockup clutch control apparatus is configured so that the controller (12) is further configured to implement correction of the clutch engagement force ($\Delta P$) by correcting the desired slippage (S*). This feature serves to reduce work load of adjustment as compared to cases where the engagement force of lockup clutch 4 is directly corrected.

<9> The lockup clutch control apparatus is configured so that the controller (12) is further configured to determine that the engine (1) is operating in the supercharger lag region, in response to determination that throttle valve opening of the engine (1) is above a predetermined first threshold value (a1) and a rate of change of the throttle valve opening is above a predetermined second threshold value (a2) and rotational speed of an input shaft of the automatic transmission (7) is below a predetermined third threshold value (a3). This feature serves to accurately estimate whether or not the engine system is in supercharger lag state, because the control permission condition is satisfied when the driver depresses the accelerator pedal with an intention to accelerate the vehicle.

<Modifications> The present embodiment may be modified as follows.

In the present embodiment, the correction of the engagement force of lockup clutch 4 is implemented by correcting the desired slippage S*. Alternatively, the correction of the engagement force of lockup clutch 4 may be implemented by directly correcting the engagement force of lockup clutch 4 by correcting the amount of feedforward control based on engine torque, for example. Alternatively, the correction of the engagement force of lockup clutch 4 may be implemented by correcting the measured engine torque. Namely, the correction of the engagement force of lockup clutch 4 may be implemented by any method of correcting the engagement force of lockup clutch 4 as a result.

In the present embodiment, it is determined that the engine is in supercharger lag state, when the rotational speed of the transmission input shaft is below a predetermined threshold value and the rate of change of throttle valve opening is above a predetermined threshold value and the throttle valve opening is above a predetermined threshold value. Alternatively, this determination may be implemented by checking the acceleration state of the vehicle or engine. Namely, the determination may be implemented by any method of determining the deviation between the measured engine torque and the actual engine torque.

In the present embodiment, the desired slippage correction Shos is reduced to increase the engagement force of lockup clutch 4 after a predetermined time period is elapsed after detection of start of supercharger lag. The trigger for the reduction of desired slippage correction Shos may be implemented by any method of determining whether or not the supercharger lag is almost eliminated.

In the present embodiment, measured engine torque Te_sen is a measured value of torque inputted to lockup clutch 4, which is obtained with reference to a predetermined engine torque map prepared experimentally or the like in which steady-state engine torque is mapped with respect to fuel injection quantity. In cases of gasoline engines, measured engine torque Te_sen may be a measured value of torque inputted to lockup clutch 4, which is obtained with reference to a predetermined engine torque map prepared experimentally or the like in which steady-state engine torque is mapped with respect to intake air quantity and engine speed. Measured engine torque Te_sen may be obtained with reference to other parameters.

In the present embodiment, the rate of increase of the engine speed is estimated based on the gear position of the automatic transmission. Alternatively, the rate of increase of the engine speed may be estimated based on the gear ratio of the automatic transmission or other parameters.

In the present embodiment, the lockup clutch control apparatus is applied to the motor vehicle provided with the diesel engine with the turbocharger. The lockup clutch control apparatus according to the present embodiment may be applied also to a vehicle provided with a gasoline engine with a turbocharger.

The entire contents of Japanese Patent Application 2010-100564 filed Apr. 26, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A lockup clutch control apparatus for controlling slippage of a lockup clutch to a desired slippage by manipulating a clutch engagement force of the lockup clutch, wherein an engine is provided with a supercharger, and a torque converter is disposed between the engine and an automatic transmission and provided with the lockup clutch, the lockup clutch control apparatus comprising:
a controller configured to:
calculate an estimated value of torque inputted to the lockup clutch;
determine whether the engine is operating in a predetermined supercharger lag region in which the estimated value deviates from an actual value of the torque; and
perform a control operation while controlling slippage of the lockup clutch,
wherein the control operation includes:
setting the clutch engagement force based on the estimated value; and
performing a first operation of correcting the clutch engagement force by reducing the clutch engagement force in response to determining that the engine is operating in the supercharger lag region.

2. The lockup clutch control apparatus as claimed in claim 1, wherein the controller is further configured to perform a second operation of correcting the clutch engagement force by setting the clutch engagement force so as to be larger when a preset time period is elapsed after determining that the engine is operating in the supercharger lag region than before the time period is elapsed.

3. The lockup clutch control apparatus as claimed in claim 2, wherein the time period is set so that the controller starts the second operation before the deviation between the estimated value and the actual value reaches about zero after determining that the engine is operating in the supercharger lag region.

4. The lockup clutch control apparatus as claimed in claim 2, wherein the controller is further configured to implement the second operation by changing the clutch engagement force more slowly than when implementing the first operation by changing the clutch engagement force.

5. The lockup clutch control apparatus as claimed in claim 2, wherein the controller is further configured to implement the second operation by changing the clutch engagement force more slowly when a rate of increase of engine speed of the engine is relatively slow than when the rate of increase of engine speed of the engine is relatively fast.

6. The lockup clutch control apparatus as claimed in claim 2, wherein the controller is further configured to implement the second operation by setting the clutch engagement force so as to be larger when a rate of increase of engine speed of the engine is relatively fast than when the rate of increase of engine speed of the engine is relatively slow.

7. The lockup clutch control apparatus as claimed in claim 1, wherein the controller is further configured to perform the first operation for a longer time period when a rate of increase of engine speed of the engine is relatively slow than when the rate of increase of engine speed of the engine is relatively fast.

8. The lockup clutch control apparatus as claimed in claim 1, wherein the controller is further configured to implement correction of the clutch engagement force by correcting the desired slippage.

9. The lockup clutch control apparatus as claimed in claim 1, wherein the controller is further configured to determine that the engine is operating in the supercharger lag region, in response to determining that a throttle valve opening of the engine is above a predetermined first threshold value, a rate of change of the throttle valve opening is above a predetermined second threshold value, and rotational speed of an input shaft of the automatic transmission is below a predetermined third threshold value.

10. A lockup clutch control method for controlling slippage of a lockup clutch to a desired slippage by manipulating a clutch engagement force of the lockup clutch, wherein an engine is provided with a supercharger, and a torque converter is disposed between the engine and an automatic transmission and provided with the lockup clutch, the lockup clutch control method comprising:

calculating an estimated value of torque inputted to the lockup clutch;

determining whether the engine is operating in a predetermined supercharger lag region in which the estimated value deviates from an actual value of the torque; and performing a control operation while controlling slippage of the lockup clutch, the control operation including:

setting the clutch engagement force based on the estimated value; and performing a first operation of correcting the clutch engagement force by reducing the clutch engagement force in response to determining that the engine is operating in the supercharger lag region.

* * * * *